United States Patent
Mayer et al.

(10) Patent No.: US 10,938,541 B2
(45) Date of Patent: Mar. 2, 2021

(54) COMMUNICATION SYSTEM AND TRANSMITTER

(71) Applicant: Fraunhofer-Gesellschaft zur Foerderung der angewandten Forschung e.V., Munich (DE)

(72) Inventors: Frank Mayer, Baiersdorf (DE); Rainer Wansch, Baiersdorf (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/272,696

(22) Filed: Feb. 11, 2019

(65) Prior Publication Data

US 2019/0173654 A1    Jun. 6, 2019

Related U.S. Application Data

(63) Continuation of application No. PCT/EP2017/070121, filed on Aug. 8, 2017.

(30) Foreign Application Priority Data

Aug. 12, 2016 (EP) ..................... 16183960

(51) Int. Cl.
| | |
|---|---|
| *H04L 12/28* | (2006.01) |
| *H04L 5/00* | (2006.01) |
| *H04B 7/185* | (2006.01) |
| *H04L 27/26* | (2006.01) |
| *H04W 72/04* | (2009.01) |
| *H04W 80/02* | (2009.01) |
| *H04L 5/14* | (2006.01) |

(52) U.S. Cl.
CPC ........... *H04L 5/0094* (2013.01); *H04B 7/185* (2013.01); *H04B 7/18513* (2013.01); *H04L 5/0064* (2013.01); *H04L 5/0076* (2013.01); *H04L 27/2607* (2013.01); *H04W 72/0446* (2013.01); *H04W 72/0453* (2013.01); *H04W 80/02* (2013.01); *H04L 5/0007* (2013.01); *H04L 5/1469* (2013.01)

(58) Field of Classification Search
CPC ....................................................... H04L 12/28
USPC ....................................................... 370/329
See application file for complete search history.

(56) References Cited

U.S. PATENT DOCUMENTS

| | | |
|---|---|---|
| 4,208,630 A | 6/1980 | Martinez |
| 4,651,156 A | 3/1987 | Martinez |
| (Continued) | | |

FOREIGN PATENT DOCUMENTS

| | | |
|---|---|---|
| CA | 1116700 A | 1/1982 |
| CN | 103327638 A | 9/2013 |
| (Continued) | | |

*Primary Examiner* — Dang T Ton
(74) *Attorney, Agent, or Firm* — Perkins Coie LLP; Michael A. Glenn

(57) ABSTRACT

A communication system includes a plurality of transmitters and a receiving unit. The transmitters are configured to divide signals to be emitted into K part signals and to emit the K part signals using K sub-carriers. K is an integer. The K sub-carriers are frequency bands having a sub-carrier bandwidth and are spaced in frequency. The receiving unit is configured to receive signals emitted by the transmitters. The invention further refers to a transmitter.

16 Claims, 12 Drawing Sheets

(56) References Cited

U.S. PATENT DOCUMENTS

| | | |
|---|---|---|
| 4,703,474 A | 10/1987 | Foschini et al. |
| 5,844,900 A | 12/1998 | Hong et al. |
| 6,266,361 B1 | 7/2001 | Huang et al. |
| 2002/0164114 A1* | 11/2002 | Golub .................. G02B 6/266 385/18 |
| 2004/0121731 A1 | 6/2004 | Walker |
| 2005/0141594 A1 | 6/2005 | Smith et al. |
| 2005/0226203 A1 | 10/2005 | Ho |
| 2006/0034199 A1 | 2/2006 | Chu et al. |
| 2006/0072646 A1 | 4/2006 | Feher |
| 2007/0087690 A1 | 4/2007 | Karabinis |
| 2007/0197241 A1 | 8/2007 | Singh et al. |
| 2007/0248173 A1 | 10/2007 | Hassan et al. |
| 2007/0263567 A1 | 11/2007 | Habetha et al. |
| 2008/0176575 A1 | 7/2008 | Sutton |
| 2008/0279173 A1 | 11/2008 | Zhang et al. |
| 2008/0310482 A1 | 12/2008 | Covell et al. |
| 2009/0028090 A1 | 1/2009 | Sim et al. |
| 2009/0041156 A1 | 2/2009 | Lakkis |
| 2009/0091400 A1 | 4/2009 | Orlik et al. |
| 2009/0213815 A1 | 8/2009 | Sherman et al. |
| 2009/0310573 A1 | 12/2009 | Sim et al. |
| 2011/0051847 A1 | 3/2011 | Flury et al. |
| 2013/0202054 A1 | 8/2013 | Khan et al. |
| 2013/0343353 A1 | 12/2013 | Maytal |
| 2016/0072545 A1 | 3/2016 | Gupta et al. |
| 2016/0094269 A1 | 3/2016 | Seller |

FOREIGN PATENT DOCUMENTS

| | | |
|---|---|---|
| CN | 104540214 A | 4/2015 |
| WO | 2008039142 A1 | 4/2008 |

\* cited by examiner

COMMUNICATION SYSTEM AND TRANSMITTER

CROSS-REFERENCE TO RELATED APPLICATIONS

This application is a continuation of copending International Application No. PCT/EP2017/070121, filed Aug. 8, 2017, which is incorporated herein by reference in its entirety, and additionally claims priority from European Application No. EP 16183960.0, filed Aug. 12, 2016, which is incorporated herein by reference in its entirety.

The invention refers to a communication system as well as to a transmitter.

BACKGROUND OF THE INVENTION

Satellite Communication may be used, among other applications, in Machine to Machine (M2M) or "Internet of Things" (IoT) type applications, connecting fixed or mobile "terminals" via a satellite communication link to the internet or other infrastructure (e.g. servers, databases, "the cloud"). Communication may be uni-directional—typically from the terminals to the satellite, e.g. for reporting location or state information or sensor readings—or bi-directional, e.g. transmitting messages or data from and to the terminals.

M2M or "IoT" type terminals may be deployed in larger quantities and thus are cost and resource constraint. Resource constraints include total energy budget (e.g. for battery powered devices), available or permitted peak transmit power, antenna gain and pointing performance and accuracy of the terminal's local oscillator used as time and frequency reference. The amount of data transmitted by a single terminal may be very small and transmissions may occur infrequently while the amount of spectrum designated to the system may be comparably large (few to several MHz of bandwidth). This allows operating the communication link at low spectral efficiency and/or assigning only a small fraction of the designated satellite link bandwidth and capacity to an individual terminal.

Such a satellite and individual terminals comprising transmitters for actually transmitting the signals are an example of a communication system.

To allow concurrent and efficient use of the satellite link bandwidth and capacity by multiple terminals, some type of "medium access control" (MAC) needs to be implemented, coordinating and scheduling the transmission from these multiple terminals, i.e. from the respective transmitters. Known MAC schemes include time, frequency and code division multiplexing or combinations and variations thereof; some of the known schemes employ centralized coordination (e.g. a central transmitter providing a time reference signal and spanning a frame or "slot" structure) while others are distributed in nature or use randomization.

The performance of many MAC schemes scales with the accuracy of each terminal's reference oscillator—i.e. the accuracy of the transmitter concerning the frequency used for emitting signals—and thus the ability to hit the designated transmission "slot". Using a centralized frequency and time division multiplex (FTDMA) scheme as an example, the accuracy of the oscillator of the transmitter defines both the time and frequency uncertainty and thus the amount of time and frequency guard intervals between the time/frequency slots assigned to different terminals in the FTDMA scheme. Absolute frequency accuracy scales with oscillator error and carrier centre frequency; as most satellite communication system operate in the GHz range (e.g. C-Band at 4 GHz, Ku-Band at 10 to 15 GHz, Ka-Band at 17 to 30 GHz), a comparable good oscillator accuracy of 1 part per million (ppm) already translates to several kilohertz (kHz) of carrier centre frequency error.

Randomized MAC schemes are known long since, with "ALOHAnet" being the first known implementation. In "ALOHAnet", each terminal randomly selects a time for transmission and sends data on the "inbound" channel to a central hub station without further coordination with other terminals; messages that are not acknowledged by the hub using broadcast messaging on the "outbound" channel are deemed lost and repeated after a randomly selected time interval. Both the original "pure ALOHA" and the improved "slotted ALOHA" MAC schemes are known for their simplicity and distributed nature, but also for their limited efficiency, limiting the traffic loading to 18.4% (pure ALOHA) and 36.8% (slotted ALOHA) to allow for maximum throughput. Slotted ALOHA involves that each terminal aligns transmissions to a predefined slot timing. Limited accuracy of the local oscillator may result in timing errors and the need for additional guard times, with the performance of slotted ALOHA then degrading towards or below the performance of pure ALOHA.

Variations of "ALOHA" using no acknowledgement are also known; these variations work uni-directional and require no "receive" capabilities in the terminals.

Extension of a randomized MAC scheme from the time domain (time slots, TDMA) to the frequency domain (frequency slots or sub-bands, FDMA) or to the time/frequency domain (time/frequency slots, FTDMA) is possible.

For a randomized MAC scheme, local oscillator error adds as a second random process (typically independent and approximately normal distributed), resulting in additional randomization of transmission time and carrier frequency. For satellite links using a pure ALOHA type MAC scheme in frequency, the second random process may dominate, resulting in a biased and unequal distribution of the selected carrier centre frequencies. Known mitigation strategies include adding another level of randomization, e.g. using frequency spreading (e.g. as disclosed in U.S. Pat. No. 6,266,361 B1 or U.S. Pat. No. 4,703,474) or frequency hopping (e.g. as disclosed in US 2005/0141594 A1). These techniques spread the signal over a bandwidth large compared to the frequency error. These known spreading or hopping techniques impose significant processing overhead on the receiver, e.g. the need for signal correlation or carrier search over large bandwidths.

In a slotted ALOHA type MAC scheme in frequency, the carrier centre frequency error will limit the minimum FDMA slot size and, thus, the number of available concurrent slots. Known mitigation strategies include use of short-time/large-bandwidth bursts. However, generation of such signal bursts may not be feasible for resource constraint M2M terminals, due to limits in available or permitted transmit power.

Deterministic MAC schemes use a centralized scheduler granting medium access to a single transmitter at a time and/or frequency, thus avoiding the potential collisions typically occurring in randomized MAC schemes.

US 2009/0310573 A1, US 2009/0028090 A1 and US 2006/0034199 A1 disclose examples for deterministic (scheduler based) MAC schemes where the medium access time is partitioned into equal sized slots, and a predetermined number of the slots forming a superframe.

US 2005/0226203 A1 discloses one example for announcing (communicating) the superframe structure and the medium access information.

US 2009/0213815 A1 extends the scheme by providing contention slots in addition to time slots dedicated to an individual terminal.

U.S. Pat. No. 5,844,900 discloses a method for monitoring a number of transmissions which can occur within the communication system and means for dynamically changing the number of slots for which nodes of the communication system contend for access to a wireless communication medium of the communication system.

While up to 100% of the time and/or frequency slots are usable in a deterministic MAC scheme, the (limited) accuracy of the terminal oscillator again translates into the need for guards in time and frequency. This results in the same issues and mitigations as discussed for randomized MAC schemes.

A deterministic MAC scheme typically involves a centralized entity or central unit. This entity (or an auxiliary entity) can also be used to provide time and/or frequency reference information, and such information may then be beneficially used in estimating and/or correcting the local oscillator error.

US 2011/0051847 A1 discloses one example for estimating and correcting a frequency offset between a local clock of a receiving transceiver.

US 2016/0072545 A1 discloses an alternative method for correcting a receiver frequency at a receiver.

US 2008/0279173 A1 calculates a carrier frequency difference or a time difference and thus also allows compensation of the frequency and/or time error of local oscillator.

U.S. Pat. No. 4,208,630, CA 1,116,700 and U.S. Pat. No. 4,651,156 disclose methods for using a RF carrier or a range-tone transmitted by a broadcast station as reference.

Other known systems use the GPS signal as reference for compensating the frequency and/or time error of the local oscillator.

SUMMARY

According to an embodiment, a communication system may have: a plurality of transmitters and a receiving unit, wherein the transmitters are configured to divide signals to be emitted into K part signals and to emit the K part signals using K sub-carriers, wherein K is an integer, wherein the K sub-carriers are frequency bands having a sub-carrier bandwidth, wherein the K sub-carriers are spaced in frequency, and wherein the receiving unit is configured to receive signals emitted by the transmitters.

Another embodiment may have a transmitter, wherein the transmitter is configured to divide a signal to be emitted into K part signals and to emit the K part signals using K sub-carriers, wherein K is an integer, and wherein the K sub-carriers are frequency bands having a sub-carrier bandwidth and are spaced in frequency.

The communication system comprises a plurality of transmitters and at least one receiving unit. The transmitters are configured to emit signals advantageously having frequencies within a system bandwidth. The transmitters are configured to divide signals to be emitted into K part signals and to emit the K part signals using K sub-carriers. K is an integer. The K sub-carriers are frequency bands having a sub-carrier bandwidth and the K sub-carriers are spaced in frequency. The receiving unit is configured to receive signals emitted by the transmitters. The receiving unit is especially configured in one embodiment to combine the part signals to entire received signals.

The transmitters are configured to emit signals. This is done by dividing the respective signal into K part signals and to emit these K part signals using K sub-carriers.

In one embodiment, the system bandwidth is divided into frequency slots that are used such that the frequencies of the emitted signals or part signals fall into the respective frequency slot.

In an embodiment, the system bandwidth is divided into a plurality of frequency slots having a slot bandwidth. The number of frequency slots belonging to the plurality of frequency slots is chosen with regard to a system capacity describing a rate at which information can be reliably transmitted from the transmitters towards the receiving unit.

The transmitters are emitting their signals using at least one slot into which the available system bandwidth is divided. The number of these slots is chosen with regard to the system capacity. The system capacity—or system transmission capacity—describes the performance of the system under the aspect of a reliable transmission of the emitted signals to the receiving unit.

In one embodiment, the receiving unit is a satellite.

According to an embodiment, the number of frequency slots is chosen under the constraint that the system capacity is maximized. In one embodiment, the number of frequency slots is varied, the corresponding system capacities are calculated or measured and then the number leading to the greatest system capacity is chosen. The mentioned maximization for choosing the frequency slots is in a further embodiment used for choosing the sub-slots which divide the mentioned frequency slots.

In one embodiment, system capacity is depending on a carrier to noise ratio and on a carrier to interference ratio. For these ratios, the corresponding model and data of the communication system are taken into consideration.

The transmitters emit signals divided into K part signals. Each of these part signals is emitted in a separate sub-carrier. The sub-carriers are designated frequency bands.

In one embodiment, the K sub-carriers—here and in the following associated with one transmitter—are frequency bands having a sub-carrier bandwidth and are equidistantly spaced in frequency with a sub-carrier distance. The sub-carrier distance is in one embodiment greater than zero, implying that the sub-carriers are well separated in frequency.

In a different embodiment, the sub-carriers are spaced in frequency with varying frequency distances.

The sub-carrier distance equals in one embodiment the slot bandwidth. In this embodiment, the system bandwidth is divided into M slots each having a slot bandwidth of the system bandwidth divided by the number of slots. The K sub-carriers used for emitting the K part signals are separated by this slot bandwidth in this embodiment.

In an embodiment, the sum of the K sub-carrier bandwidth is smaller than the slot bandwidth of the frequency slots of the system bandwidth.

In one embodiment, the number of the part signals and, thus, the number of sub-carriers is smaller than the number of slots into which the entire system bandwidth is divided.

In an embodiment, the system bandwidth is divided into a plurality of frequency slots having a slot bandwidth. Further, each frequency slot is divided into a plurality of sub-slots.

In an embodiment, a distance between the sub-slots is based on the slot bandwidth.

If in one embodiment, the frequency distance between two sub-carriers equals the slot bandwidth, then each sub-carrier will fall into a different frequency slot. Therefore, in an embodiment, the sub-carrier distance in frequency between the sub-carriers is based on the slot bandwidth. This holds for the case, that the bandwidth of the sub-carriers $BW_K$ equals the bandwidth of the sub-slots $BW(M_S)$. In the embodiment, that the bandwidth of the sub-carriers $BW_K$ is smaller than the sub-slot bandwidth $BW(M_S)$, then is—in one embodiment—the distance between the sub-slots larger than the slot bandwidth.

In one embodiment, the number of frequency slots—given by M—is set to one. Hence, there is just one slot and the sub-slots are chosen with regard to the entire system bandwidth. If M is greater than one, then the sub-slots are chosen in one embodiment with regard to the bandwidth of the frequency slots.

In one embodiment, the number of frequency slots M is selected so that the resulting slot bandwidth matches that reference bandwidth used in spectral power-density masks, e.g. 4 kHz (FCC) or 40 kHz (ITU). In an embodiment, the number of frequency slots is set such that the slot bandwidth equals a given reference value.

In another embodiment, the number of frequency slots M is selected advantageous for the implementation, e.g. using a Fast Fourier Transform (FFT) with a bin size equal to the sub-carrier bandwidth and a number of bins that results in a power of 2. In an embodiment, the number of frequency slots is set such that the slot bandwidth and the resulting sub-slot bandwidth facilitate calculations.

In one embodiment, the number of frequency slots M is selected with the aim to reduce offcut when dividing system bandwidth into M frequency slots and dividing the frequency slots into the sub-slots and/or dividing the sub-slot bandwidth with regard to the sub-carriers.

In one embodiment, the number of frequency slots M is greater than the number K of sub-carriers. Advantageously, both numbers are chosen in order to reduce a possible overlap of signals stemming from different transmitters.

In one embodiment, M and K are chosen such that the expression $(M-K)/BW_K$ with the bandwidth of the sub-carrier $BW_K$ equals the maximum frequency error of the transmitter.

In one embodiment, the sub-carrier of the K sub-carriers having the lowest frequency is offset to a given frequency—which is in one embodiment the lower limit of the system bandwidth or in a different embodiment the lower limit of a frequency slot or a sub-slot—by an individual offset. Wherein the individual offset is in one embodiment the result of a frequency accuracy of the transmitter.

In a different embodiment, the sub-carrier of the K sub-carriers having the highest frequency is offset to a given frequency—e.g. higher limit of the system bandwidth—by an individual offset.

In an embodiment, the offset results from a frequency estimated by the transmitter. In a different embodiment, the transmitter uses a random number for calculating the offset via any given formula. In a third embodiment, the transmitter receives an individual assigned number for obtaining the offset.

In a different embodiment, a frequency slot or sub-slot is assigned to the transmitter in order to put one part signal into this frequency slot or sub-slot.

According to an embodiment, each sub-carrier lies within a sub-slot, where each sub-slot is a frequency band having a sub-slot bandwidth. In one embodiment, the system bandwidth is divided into M frequency slots that are divided into $M_S$ sub-slots.

In an embodiment, the sub-slot bandwidth is equal to and is in a different embodiment greater than the sub-carrier bandwidth. Hence, in one embodiment the sub-slot is to be used by the entire sub-carrier. In a different embodiment, the sub-carrier has a smaller frequency bandwidth than the associated sub-slot implying that the part signal has a smaller spectral width than the sub-slot.

In an embodiment, the sub-slot bandwidth of the sub-slots is equal to or greater than the sum of the sub-carrier bandwidth of the sub-carrier and two times a guard level where the guard level is depending on a frequency error associated with the transmitters. Here, a frequency error is used to limit the range of the sub-carrier with regard of the available bandwidth of the sub-slot.

In an embodiment, the sub-carrier bandwidth is equal to or smaller than the sub-slot bandwidth of the sub-slots times a frequency utilization factor based on a probability of transmitters emitting overlapping signals. Here, the overlap of signals emitted by different transmitters and the possibility that a signal lies outside of the system bandwidth are used to specify the bandwidth of the sub-carrier.

According to an embodiment, the central unit is configured to assign frequency slots and/or sub-slots to transmitters in order to be used for emitting the signals. In this embodiment, the frequency slots and/or sub-slots to be used for emitting or transmitting signals are set and assigned to the transmitters by a central unit.

In one embodiment, at least one transmitter is configured to select at least one frequency slot and/or sub-slot to be used for emitting the signals. Here, at least one transmitter is autonomous and chooses at least one frequency slot and/or sub-slot by itself.

In the following a second type of system and slot usage will be discussed. All variants can be used to obtain the number of frequency slots or the number of sub-slots.

In an embodiment, a number of sub-slots is chosen with regard to a system capacity ($Cap_S$) describing a rate at which information can be reliably transmitted from the transmitters towards the receiving unit.

According to an embodiment, the number of sub-slots is a positive integer. The number of sub-slots is smaller than a maximal slot number. The maximal slot number is depending on the system bandwidth divided by a guard level. Finally, the guard level is depending on a frequency error associated with the transmitters.

The guard level—as a frequency interval—is a kind of safety margin due to a frequency inaccuracy of the transmitters. This implies that an improved oscillator of a transmitter allows using a smaller guard level. Hence, the guard level is set depending on the frequency accuracy characteristics of the used transmitter.

In one embodiment, the maximal slot number is given by the system bandwidth divided by two times the guard level.

According to an embodiment, the slot bandwidth of the frequency slots is given by a difference between the system bandwidth divided by the number of frequency slots and two times the guard level. If the slot bandwidth is given by $BW_M$, the system bandwidth is given by $BW_S$, the number of slots is given by M and the guard level is given by x, then the slot bandwidth is given by $BW_M=(BW_S/M)-2*x$. This correspondingly holds for the relationship between the bandwidth $BW(M_S)$ of the $M_S$ sub-slots and the bandwidth of the slots $BW_M$: $BW(M_S)=(BW_M/M_S)-2*x$.

The following or third type of system chooses the number of frequency slots under the aspect of a probability of overlapping emitted signals.

In one embodiment, the number of frequency slots is chosen taking a probability for overlapping signals emitted by different transmitters into account. The probability depends on a frequency utilization describing a number of transmitters emitting signals. In a similar embodiment, the number of sub-slots is chosen taking the mentioned probability into account.

According to an embodiment, the frequency utilization is depending on the system bandwidth, the number of frequency slots and a guard level depending on a frequency error associated with the transmitters. In a different embodiment, the frequency utilization is depending on the bandwidth of the slots, the number of sub-slots and the guard level depending on a frequency error associated with the transmitters.

In one embodiment, the system capacity is depending on the number of frequency slots (or sub-slots) and the frequency utilization. Further, the system capacity is depending in one embodiment on a reduced slot bandwidth being the slot bandwidth divided by the frequency utilization. This last embodiment implies that the slot bandwidth is affected by the frequency utilization, effectively, reducing the usable slot bandwidth. In a similar embodiment, a reduced sub-slot bandwidth is used.

According to an embodiment, the number of frequency slots or the number of sub-slots is chosen based on a weighted system capacity. Additionally, the weighted system capacity is based on the probability for overlapping signals and the system capacity. In this embodiment, the system capacity depending on the carrier signal to noise and interference ratio is combined with the probability of overlapping signals.

The object is also achieved by a transmitter.

The transmitter is configured to divide a signal to be emitted into K part signals and to emit the K part signals using K sub-carriers. The number K is an integer. Further, the K sub-carriers are frequency bands having a sub-carrier bandwidth and are spaced in frequency.

The above discussed embodiments of the transmitter of the system also hold with regard to the transmitter without a system or in a system different to the system discussed above.

In one embodiment, one sub-carrier has an offset to a given frequency, and the offset depends on a frequency error of the transmitter with regard to the emission of signals. In this embodiment, the sub-carriers are located relative to a frequency which is, for example, within a system comprising a transmitter a lower or higher limit of an available bandwidth. In a different embodiment, the offset is an individual offset, whereas each transmitter within a given system has its own offset.

The described transmitter is in an embodiment a part of a communication system. Such a communication system comprises in an embodiment a plurality of transmitters and a receiving unit (e.g. a satellite) that receives signals emitted by the transmitters. The transmitters are in one embodiment configured to emit their signals in the form of K part signals, whereas the K part signals are emitted using K frequency bands having sub-carrier bandwidths. In one embodiment the K frequency bands are equidistantly spaced in frequency with a sub-carrier distance. This sub-carrier distance is in one embodiment equal to the slot bandwidth of the frequency slots into which the available system bandwidth of frequencies available for communication is divided. In another embodiment, the frequency band having the lowest frequency of the K frequency bands of a transmitter is distanced by an individual offset to the lower limit of the system bandwidth. This individual offset is in one embodiment the result of the accuracy the transmitter provides concerning the frequency of the emitted signals or more precisely part signals.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
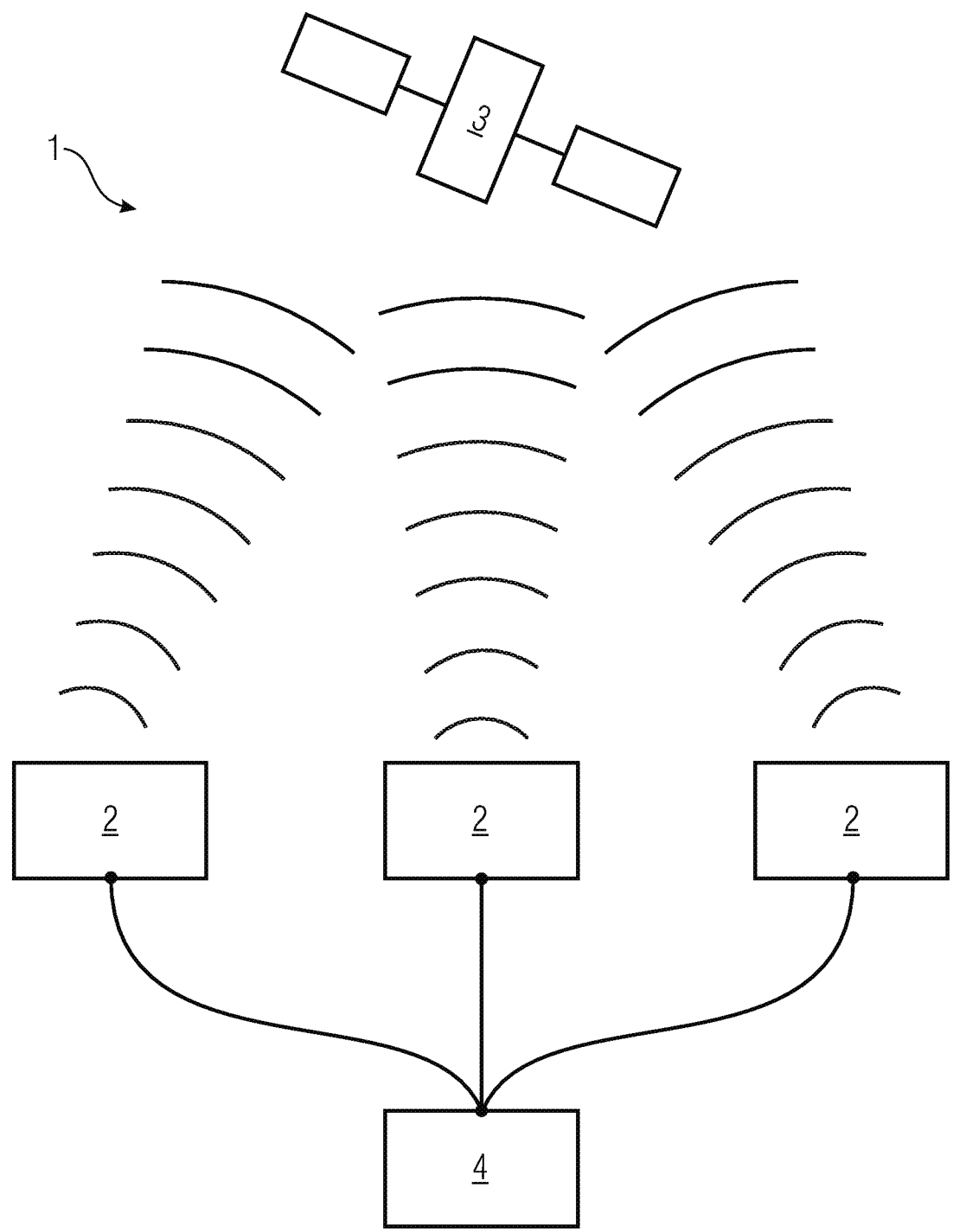
FIG. 1 shows a block diagram of a communication system.

FIG. 1 shows schematically a communication system 1 in which a plurality of transmitters 2 emit signals towards a receiving unit 3. The receiving unit 3 in this example is a satellite.

Further, the transmitters 2 are connected to a central unit 4 working as a scheduler. The central unit 4 assigns frequency slots to the transmitters 2 to be used for emitting the signals.

The receiving unit 3 is configured to receive the part signals of the transmitters 2 and to combine them to resulting received signals.

The system 1 has a system bandwidth $BW_s$ that defines the frequency range in which the emitted signals are located. The system bandwidth $BW_s$ is divided into different frequency slots that are to be used by the transmitters 2.

In a different embodiment, at least one transmitter chooses by itself at least one frequency slot to be used for emitting signals.

It follows a discussion of a first variant of the system and of an embodiment of a transmitter. This first variant is an example and is in a different embodiment combined with any of the following variants.

The transmitter emits signals divided into K signal portions or part signals. These K part signals are emitted in one embodiment simultaneously and in a different embodiment one after another. Further, each signal portion or part signal is emitted using a different sub-carrier having a sub-carrier bandwidth $BW_K$. The transmitters use for emitting their signals K sub-carriers separated by a frequency difference $BW_M$.

Figure 2:
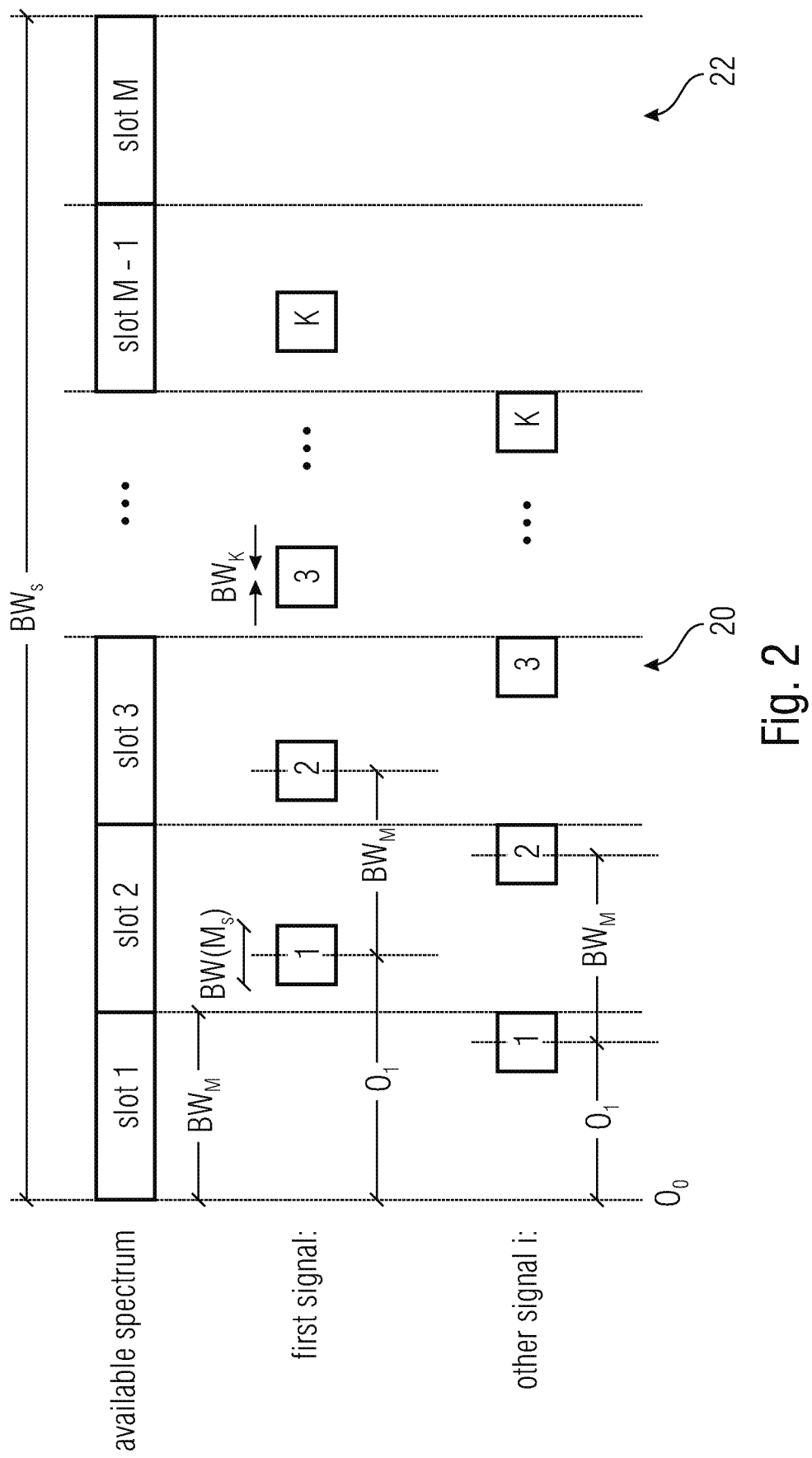
FIG. 2 shows an arrangement of sub-carriers within frequency slots of a system using a first variant.

For the system 1 having a plurality of transmitters 2, the total bandwidth $BW_s$ designated to the system is sub-divided into M frequency slots 22, each having a bandwidth $BW_M=BW_s/M$ (compare FIG. 2).

The signals of the transmitters 2—here sometimes named carrier signals—are divided into K part signals. The K part signals are emitted using K sub-carriers 20; these sub-carriers are in one embodiment equidistantly spaced in frequency with a distance $BW_M$, where $BW_M$ is the bandwidth of the frequency slots 22 into which the system bandwidth $BW_s$ is divided. The sub-carriers have in one embodiment all the same bandwidth $BW_K$.

A first sub-carrier 20 to be used by a first transmitter is placed at an offset $O_1$ relative to a start frequency of the designated system bandwidth $BW_s$ (compare FIG. 2).

The second and any other carrier signals emitted by other transmitters are also emitted using K part signals via K sub-carrier 20; these sub-carriers 20 are equidistantly spaced in frequency with the same distance $BW_M$ and with each sub-carrier 20 having the same bandwidth $BW_K$.

The first sub-carrier of the second and any other carrier signal is placed in this embodiment at an offset $O_i$, relative to the start frequency $O_0$ of the total system bandwidth $BW_s$. Hence, the K frequency slots to be used by a transmitter for emitting K signals portions are set with an offset $O_i$ relative to a frequency which is in one embodiment the lower frequency limit of the system frequency bandwidth.

The offset $O_i$ is in one embodiment individually set. This is done e.g. by an assignment by the central unit. In a different embodiment, the offset $O_i$ depends on an accuracy of the transmitter concerning the frequency of the emitted signals. The offset $O_i$ is in one embodiment used to offset a sub-carrier relative to a given frequency or, for example, relative to a frequency associated with a frequency slot or a sub-slot.

Hence, the transmitters 2 use the same scheme for emitting their signals as part signals. As the frequency locations of the respective sub-carriers are depending on a frequency accuracy of the transmitters or on an individually assigned location or on other random variables, the chance that sub-carriers of the different transmitters overlap is reduced.

The carrier signal partitioning and sub-carrier arrangement is illustrated in FIG. 2. It can be seen that the different offsets $O_i$ lead to different locations of the respective K sub-carriers 20 (here numbered 1 . . . K) and, thus, the K part signals. So, the risk of an overlap of the individual part signals of different transmitters is reduced.

The rows from top to bottom are:

The system bandwidth $BW_s$ showing the range of frequencies available to the communication of the system.

The M frequency slots into which the system bandwidth is divided.

The bandwidth of a slot $BW_M$.

The bandwidth of a sub-slot $BW(M_S)$ and of a sub-carrier $BW_K$, respectively, for emitting a signal portion, wherein the signal to be emitted is divided into K signal portions which are emitted using K sub-carriers. The bandwidth of the sub-carrier is smaller than the bandwidth of a sub-slot, as will be explained in the following.

The K sub-carriers for emitting the signal parts of a first signal.

The offset $O_1$ by which the center of a first sub-carrier of the K sub-carriers is offset from a frequency that is in the shown embodiment the lower frequency limit of the frequency band allocated to the system. The sub-carriers are separated by the bandwidth of the slots: $BW_M$.

A different signal i emitted by a different transmitter. Due to a different frequency accuracy, the offset $O_i$ of this signal differs from the offset $O_1$ of the first signal.

M as the number of frequency slots and K as the number of part signals are selected so that $(M-K)/2·BW_M$ is larger than the expected frequency error resulting from the inaccuracy of the local oscillator.

Without frequency error, $O_i=(M-K)/2·BW_M$ will centre the sequence of sub-carriers within the total bandwidth $BW_s$ designated to the system.

Assuming a frequency error bound to the range $(M-K)/2·BW_M$, the sequence of sub-carriers will be offset in frequency, but will remain fully within the designated bandwidth $BW_s$.

Furthermore, it is advantageous to use a large value for M so that $BW_M$ is small compared to the standard deviation in the probability distribution that characterizes the frequency error.

Under these conditions, the variation of the frequency error will be large compared to $BW_M$, and the location of the sub-carriers relative to the slot boundaries will approximately follow an equal distribution; this eliminates the need to explicitly randomize the $O_i$.

As an example, assume $BW_s=1$ and $M=1000$, thus $BW_M=0.001$. Assume the frequency error follows a Normal Distribution, $\mathcal{N}(\mu, \sigma^2)$, with $\sigma=0.05/3$.

Using known properties of the Normal Distribution, 68.3% of the values will be within the interval $\mu-\sigma$ to $\mu+\sigma$. The vast majority of the values (99.7%) will be within the interval $\mu-3\sigma$ to $\mu+3\sigma$.

Using $3\sigma=0.05$ as the design target, the guard interval x that may be used is given by $2*x=2*0.05=2*50*BW_M$.

Therefore, K can be calculated by $K=M-(2*x/BW_M)$ which becomes here $K=1000-(2*0.05/0.001)=1000-100=900$.

Figure 3:
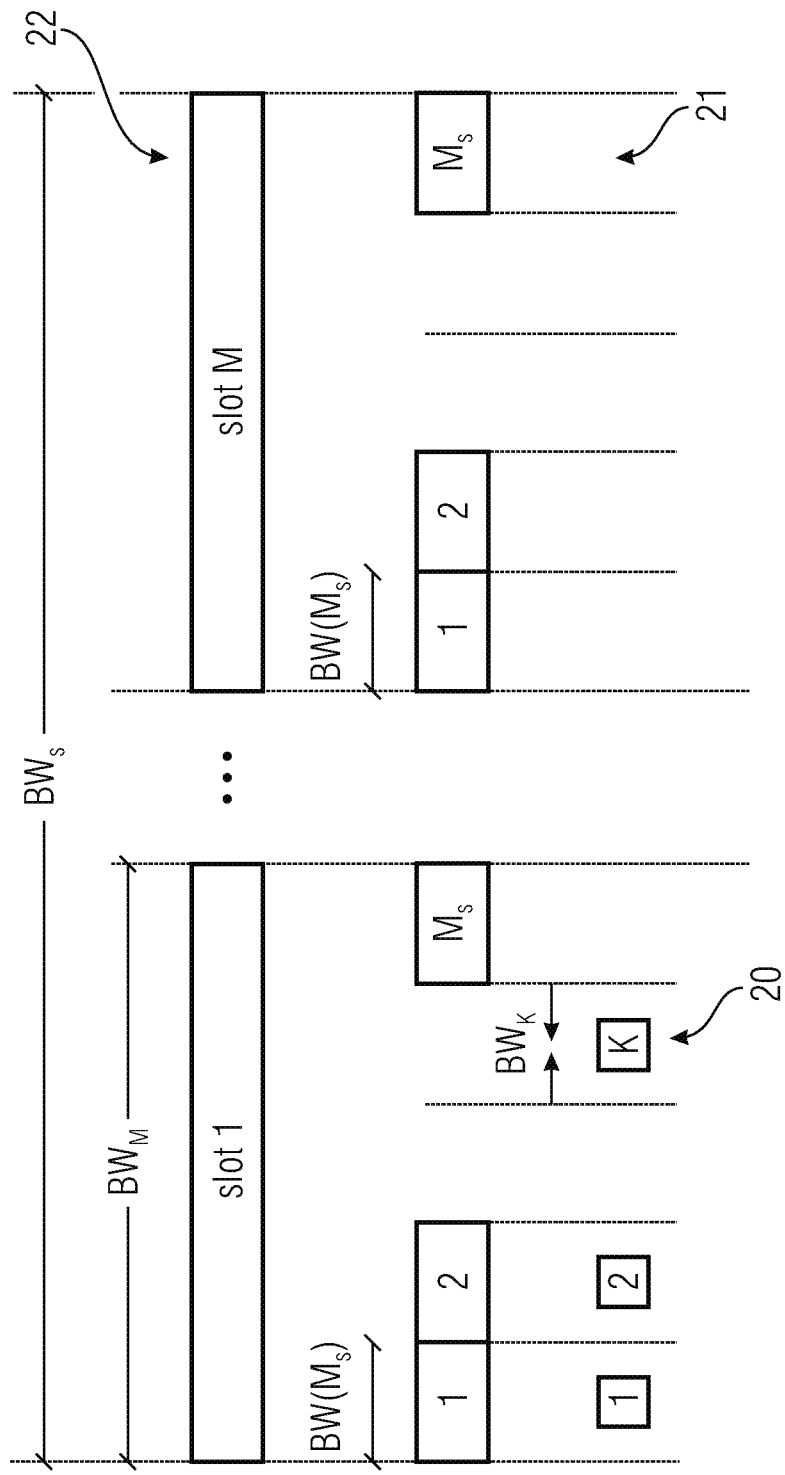
FIG. 3 shows an arrangement of sub-slots within frequency slots.

FIG. 3 shows that the system bandwidth $BW_S$ is separated in M frequency slots 22 having a bandwidth $BW_M$. The frequency slots 22 are divided each into $M_S$ sub-slots with a bandwidth $BW(M_S)$. In these sub-slots are located the K sub-carriers 20 having a bandwidth of $BW_K$.

Figure 4:
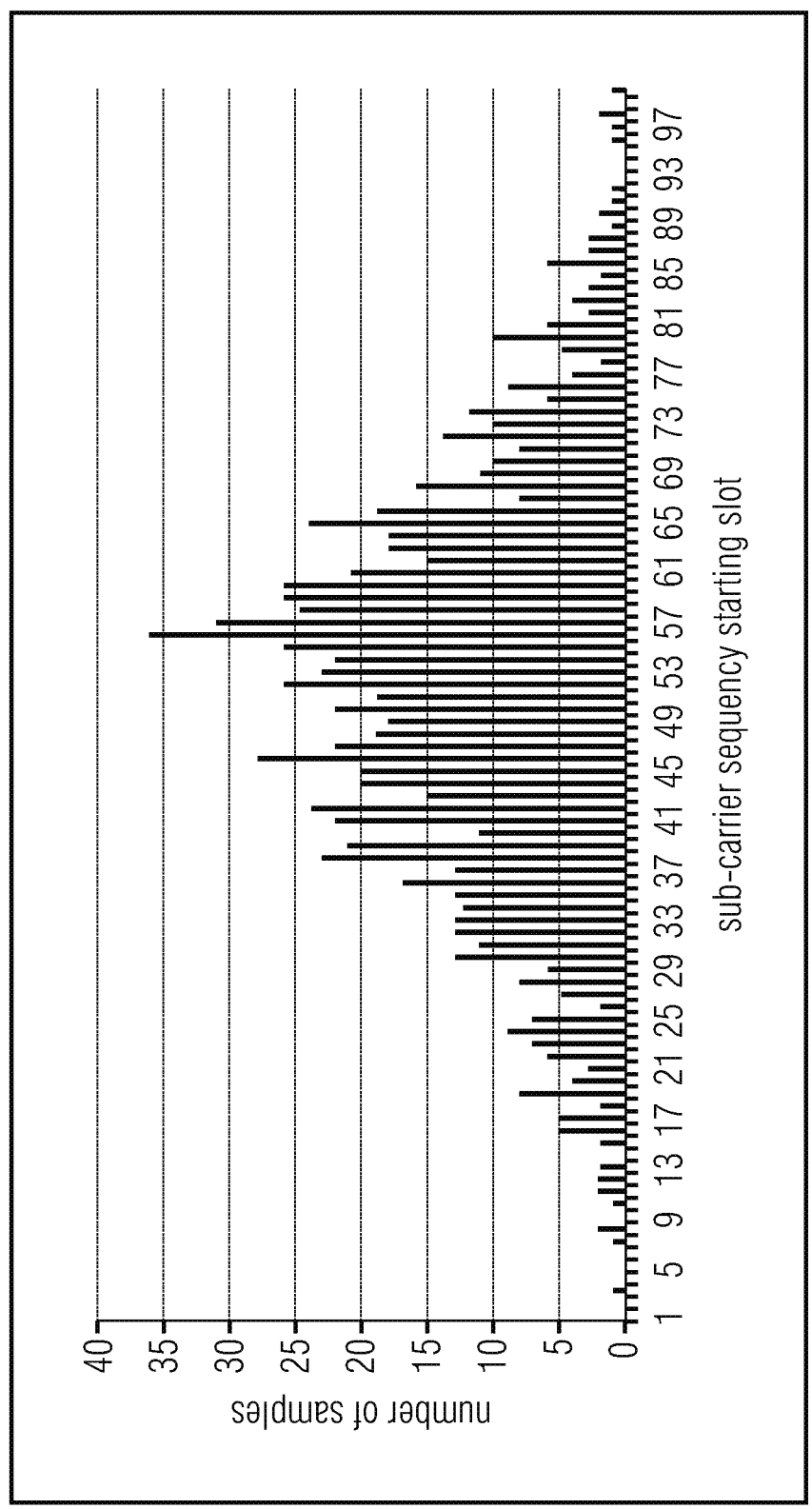
FIG. 4 shows a starting slot histogram.

FIG. 4 shows a histogram of the sub-carrier sequence starting slot, generated in an experiment with 1000 trials, representing the approximate shape of the Normal Distribution $\mathcal{N}(\mu, \sigma^2)$ with $\mu=50$ and $\sigma=50/3$. The starting slot is the slot of the system bandwidth in which the sub-carrier with the lowest frequency is located, i.e. the sub-carrier offset by the respective offset $O_i$ from the lower limit of the system bandwidth $BW_s$.

Figure 5:
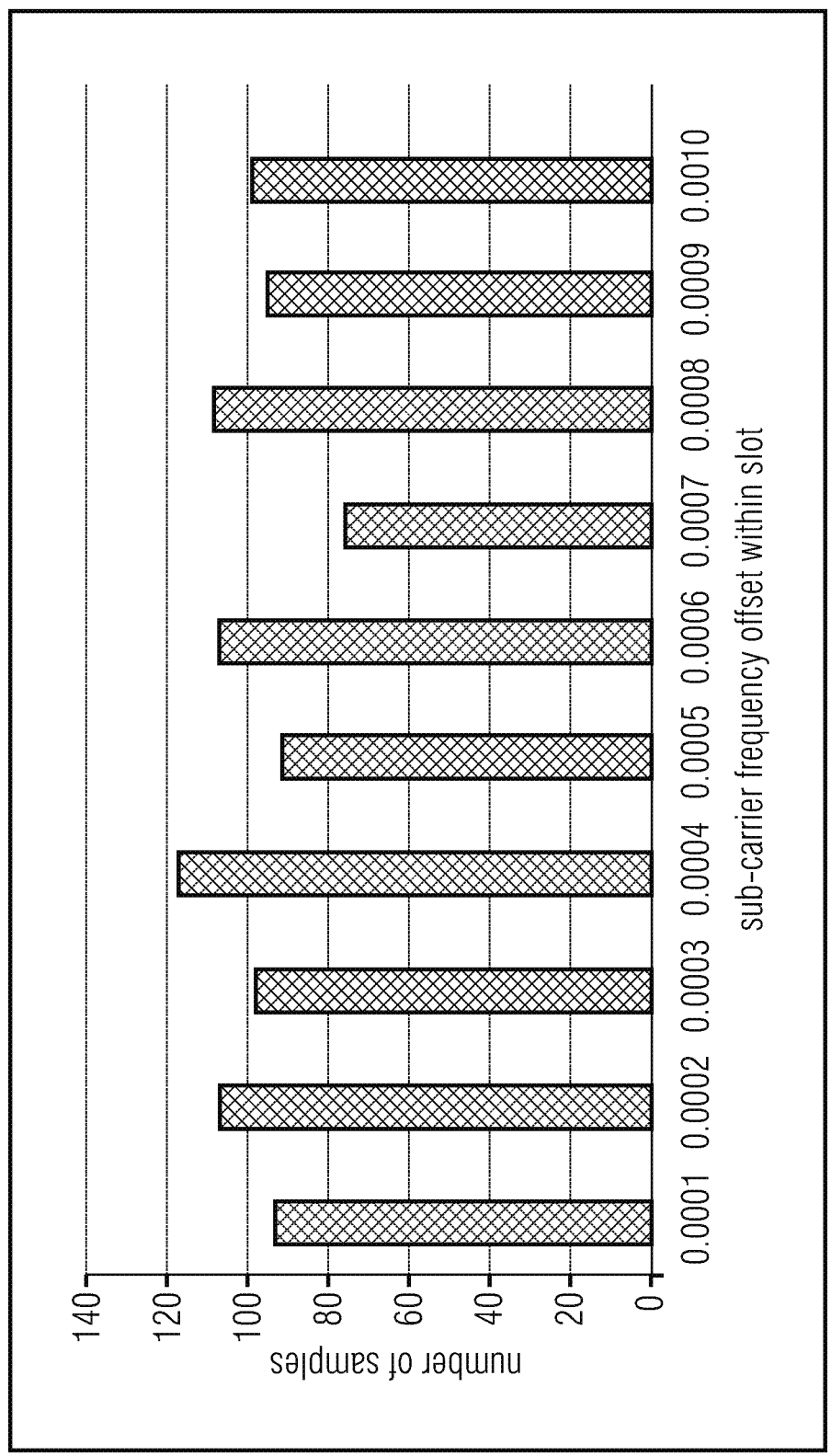
FIG. 5 shows a frequency offset histogram.

FIG. 5 shows the histogram of the corresponding sub-carrier frequency offset $O_i$ relative to the start of the respective frequency slot, using 10 frequency bins. This illustrates that this offset is approximately equally distributed. Here, the offset $O_i$ is dependent on the frequency accuracy and is, thus, given by the transmitter as the frequency accuracy or frequency error is inherent to the transmitter.

The same sub-carrier spacing $BW_M$ is used for all signals; therefore an overlap between two sub-carriers in one slot repeats in subsequent slots.

The method for optimizing the system capacity as described in the following third or fourth variant is applied in one embodiment to the first variant. This is done by substituting $BW_s$ by $BW_M$ in the third or fourth variant, and extending the sub-slot optimization from one slot (M=1) to the plurality of slots (M greater than 1).

The first variant inherits the benefits from the third or fourth variant (see below) and adds further advantages.

In one embodiment, no explicit randomization of the offset values $O_i$ is performed. Each terminal/transmitter i implicitly randomizes (in one embodiment due to local oscillator inaccuracy) the frequency offset $O_i$ of the sequence of sub-carrier.

M and K are constructed in one embodiment to maximize utilization of the designated bandwidth $BW_s$ and to result in $O_i$ approximately equally distributed, largely independent of the characteristic probability distribution of the local oscillator frequency error.

M and K are constructed in one embodiment so that the sequence of sub-carriers spans a wide bandwidth: $BW_S-(M-K)\cdot BW_M$. This is equivalent to maximizing $K\cdot BW_M$.

Such a wide bandwidth is beneficial for improved robustness in frequency-selective channels (attenuation or interference is a function of frequency). A further advantage arises for compliance with spectral power-density masks, e.g. limiting the allowed transmitted power within each 4 kHz (FCC) or 40 kHz (ITU) band; selecting $BW_M$ as a multiple of 4 kHz (or 40 kHz) allows K times higher total transmitted power compared to transmitting only a single carrier within a 4 kHz (or 40 kHz) band.

The sequence of sub-carrier is equidistantly spaced in frequency.

Such a known distance $BW_M$ between sub-carriers transmitted by the same transmitter is useful for "collecting" the sub-carrier belonging to the same transmission in a receiver, e.g. using poly-phase filters or FFT based algorithms.

Further, in one embodiment, the known repetition of the K sub-carriers transmitted by the same transmitter in subsequent frequency slots is used in the receiver when identifying the sub-carrier frequency offset. The search can be limited to a single frequency slot of bandwidth $BW_M$ as the sub-carrier frequency offset is identical in all used slots.

In a different embodiment, non-equally spaced sub-carriers are used. In a further embodiment, hierarchical frequency partitioning, using groups of slot, each group spanning a dedicated fraction of the designated bandwidth $BW_s$ and limiting the sub-carrier sequence to the slots belonging to one group.

The sub-carrier bandwidth $BW_K$ in relation to slot bandwidth $BW_M$ in the first variant is chosen in one embodiment based on at least one of the following variants in which the number of frequency sub-slots $M_s$ is e.g. the ratio between $BW_M$ and $BW_K$. The numbers $M_S$ and thus $BW_K$ may be obtained using one of the following embodiments.

The first variant or any variant of combination of variants may be used in a following general system.

Satellite communication links are typically impaired by (thermal) noise and potentially also by interference from other systems. For (thermal) noise, the resulting carrier to noise ratio C/N is given by $$C/N = \frac{P_{terminal} \cdot G/T}{L_{path} \cdot C_{Boltzmann} \cdot BW}$$

with $P_{terminal}$ being the signal power transmitted by the terminal towards the receiving satellite, G/T characterizing the satellite receiver performance, $L_{path}$ being the sum of all propagation path losses, $C_{Boltzmann}=1.38\cdot 10^{-23}$ J/K being the Boltzmann constant and BW being the transmitted signal bandwidth in Hertz.

For a given communication link, G/T and $L_{path}$ are fixed, thus C/N is proportional to $P_{terminal}$/BW. Furthermore, assuming $P_{terminal}$ is limited by the transmit power capability of the terminal, C/N is indirectly proportional to the signal bandwidth BW. Doubling the signal bandwidth BW degrades the signal to noise ratio C/N to 50% of the original value while halving the signal bandwidth BW doubles the resulting C/N.

Assuming interference is constant and homogenously spread over the utilized spectrum (bandwidth BW), also the C/I ratio is indirectly proportional to the signal bandwidth BW.

The same relation holds for the signal to noise and interference ratio, C/(N+1).

Using the Shannon-Harley theorem, the signal to noise and interference ratio can be translated into an estimated link capacity (in bps), given by:

$$Cap = BW \cdot \log_2(C/(N+1)+1).$$

Figure 6:
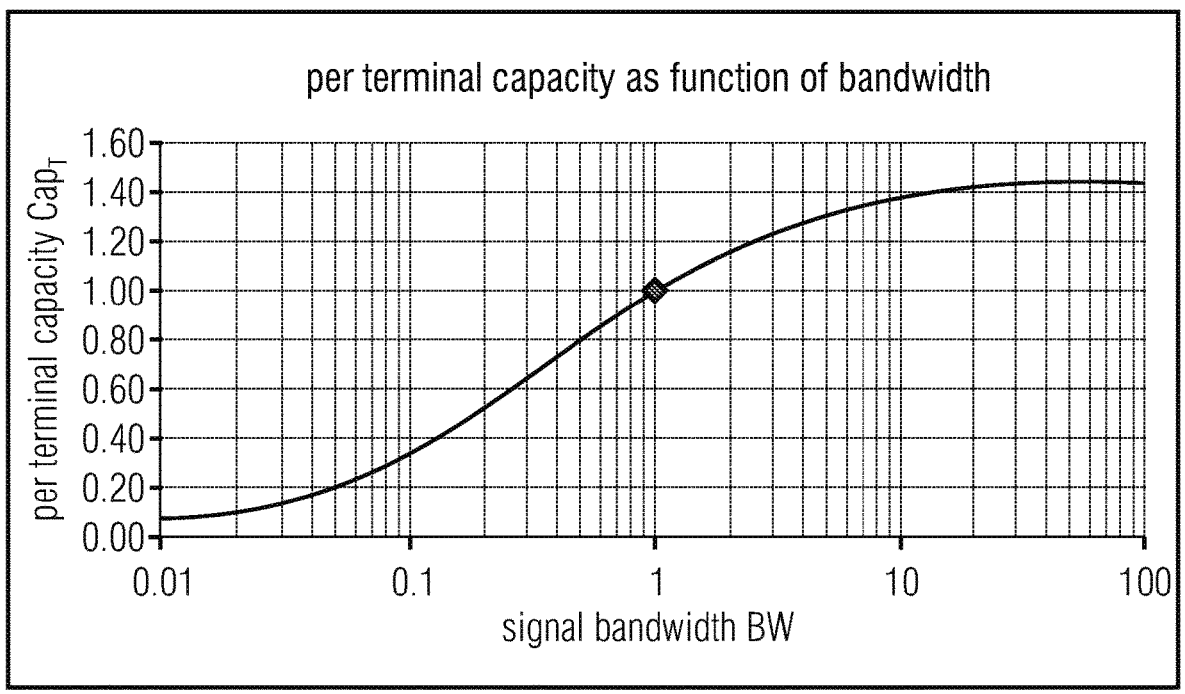
FIG. 6 illustrates a per terminal, i.e. per transmitter capacity as a function of the bandwidth available to the transmitter.

FIG. 6 shows the estimated per-terminal or per transmitter link capacity $Cap_T$ as a function of bandwidth BW, for normalized C/(N+1)=1 for BW=1.

Figure 7:
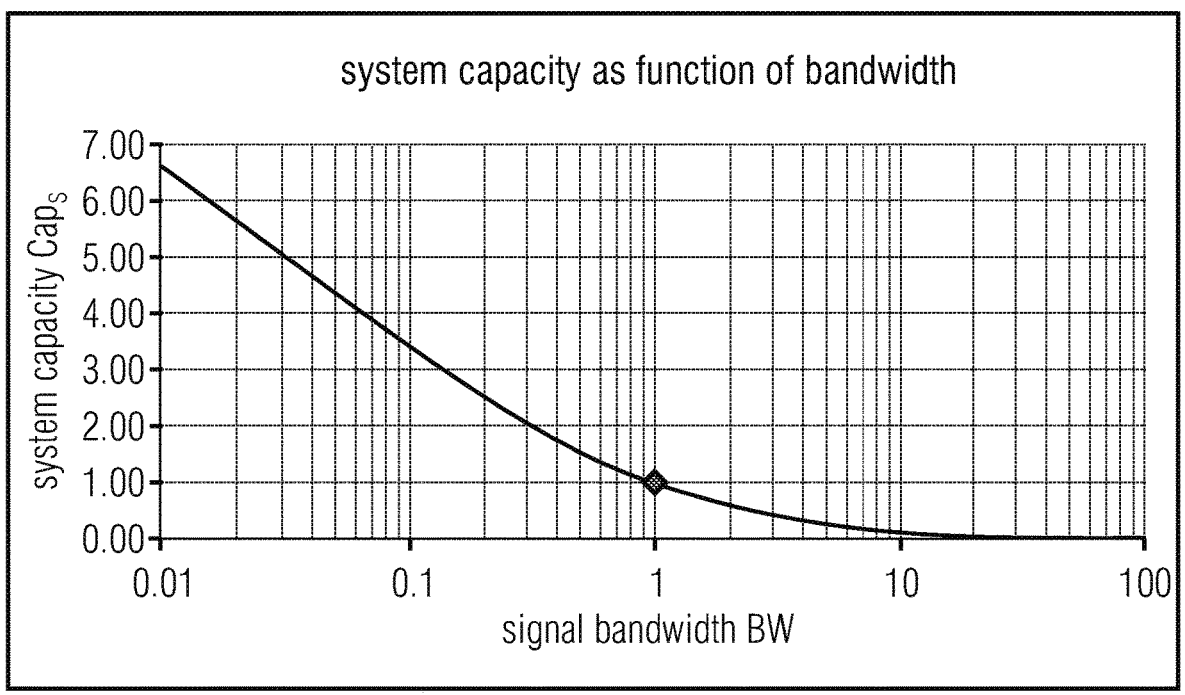
FIG. 7 illustrates a system capacity as function of bandwidth.

From the Shannon-Harley theorem and from the illustration in FIG. 6 it becomes obvious that the link capacity increases with signal bandwidth BW. While this appears to favor the use of larger bandwidth signals for increasing the per-terminal capacity $Cap_T$, use of smaller carriers allows putting more concurrent terminal transmissions into the same total amount of spectrum. This reduction in carrier size outweighs the degradation in per-terminal capacity and improves the total system capacity $Cap_S$, as shown in FIG. 7.

As discussed previously, local oscillator accuracy and the resulting frequency error sets a practical lower limit for sizing the signal bandwidth BW (i.e. in one embodiment a slot bandwidth), as this frequency error is a function of the oscillator accuracy and the signal center frequency and does not scale with the signal bandwidth.

Figure 8:
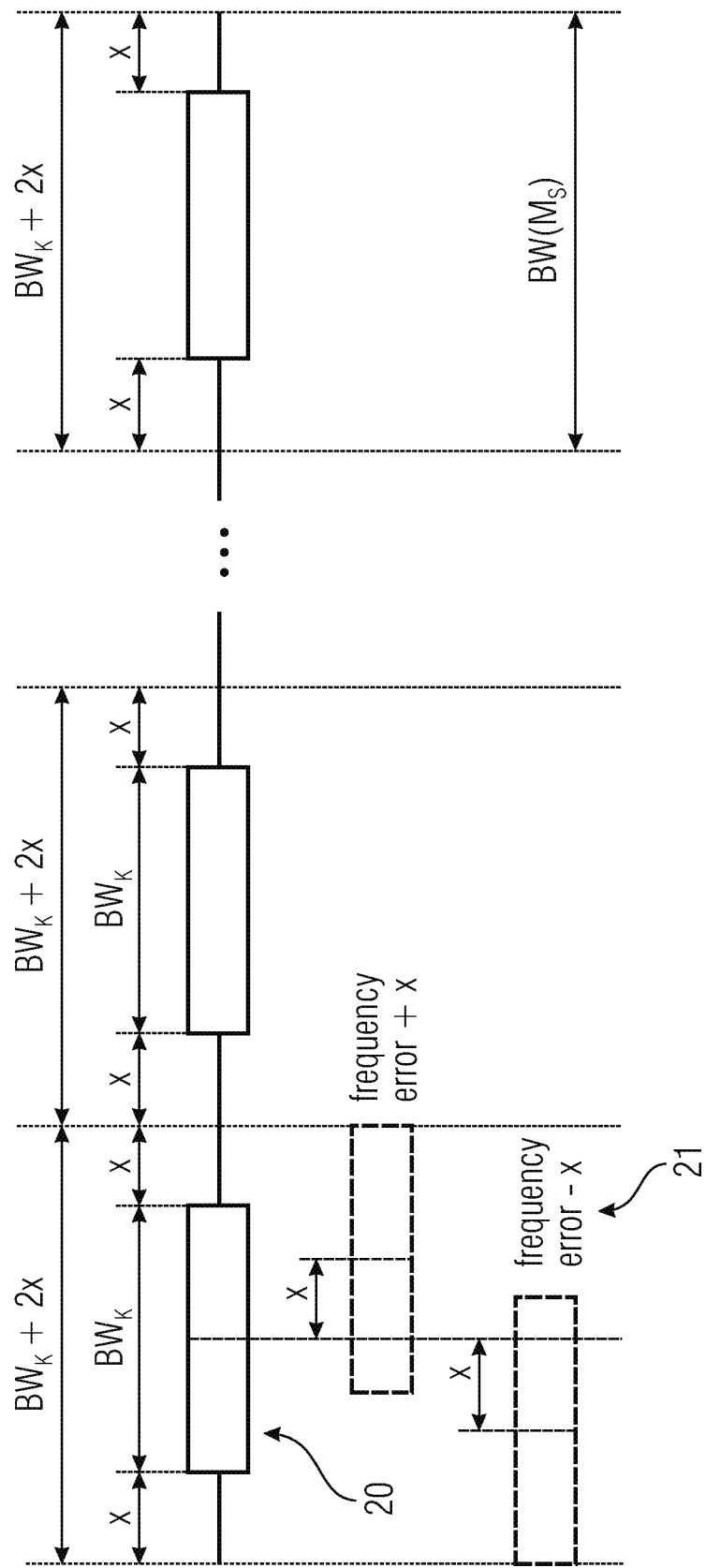
FIG. 8 illustrates the frequency slots with guard intervals of a system using a second variant.

Assuming the frequency error is x, a guard interval of two times the x may be used between each pair of signal carriers in an FDMA system, to avoid potential overlap of the signals. This is illustrated in FIG. 8.

Each bandwidth $BW_K$ of a sub-carrier 20 is surrounded by the guard interval x. As the guard interval x reaches the bandwidth $BW(M_S)$—which is here the bandwidth of the sub-slots 21—from the upper and lower frequency side, the total bandwidth per sub-slot becomes $BW_K+2x$ with a usable bandwidth $BW_K$, i.e. this is the bandwidth to be used by the transmitters for emitting the signals.

In a second variant of the invention, the number of carrier signals and the bandwidth $BW_K$ of each carrier signal is selected to maximize system capacity $Cap_S$. This is done by calculating the bandwidth $BW(M_S)$ of the sub-slots 21 (or in a different embodiment with M=1 of the entire system bandwidth $BW_S$) as a function of the number of sub-slots $M_S$ and the guard interval x, assuming $BW_S$ is the total bandwidth designated to the system by using the equation $BW_S=M_S\cdot(BW(M_S)+2x)$. This is followed by calculating the corresponding system capacity $Cap_S(M_S)$ for each frequency bandwidth $BW(M_S)$ and then identifying the number of carriers $M_S$ that maximizes $Cap_S(M_S)$. The frequency bandwidth $BW_M$ of the frequency slots is calculated by:

$$BW(M_S) = \frac{BW_s}{M_S} - 2x.$$

This second variant is demonstrated in the following table using $BW_S=1$ and $x=0.05$.

|        | BW ($M_S$) | $Cap_S$ ($M_S$) |
|--------|------------|-----------------|
| N = 1  | 0.90       | 0.97            |
| N = 2  | 0.40       | 1.45            |
| N = 3  | 0.23       | 1.68            |
| N = 4  | 0.15       | 1.76            |
| N = 5  | 0.10       | 1.73            |
| N = 6  | 0.07       | 1.60            |
| N = 7  | 0.04       | 1.38            |
| N = 8  | 0.03       | 1.07            |
| N = 9  | 0.01       | 0.65            |
| N = 10 | 0.00       | n/a             |
| N = 11 | n/a        | n/a             |
| N = 12 | n/a        | n/a             |

Figure 9:
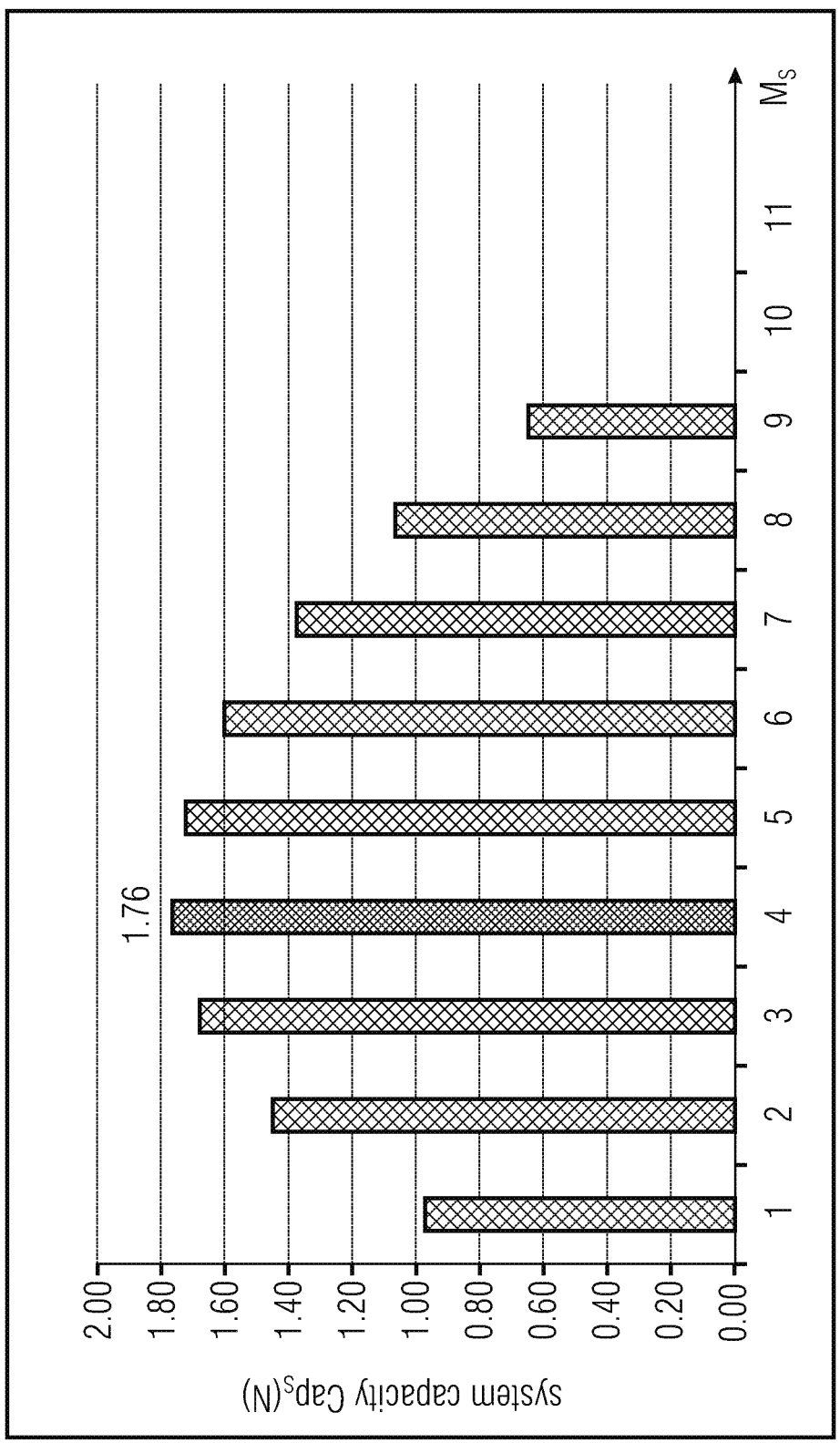
FIG. 9 shows the system capacity for the second variant.

The resulting system capacity $Cap_S(M_S)$ is illustrated in FIG. 9.

The number of sub-slots $M_S=4$ with a frequency bandwidth $BW(M_S)=0.15$ is identified as the recommended number of carriers, providing $Cap_S(M_S)=1.76$.

Note that there is no feasible solution for $M_S=10$ or above, as all designated bandwidth would be consumed by guard intervals, leading to $BW(M_S)=0$.

Thus, the maximum number of sub-slots Mmax is here given by: Mmax=$BW(M_S)/(2*x)=1/(2*0.05)=10$. This results from the fact that with the maximal number of frequency slots Mmax, the bandwidth of the slots becomes 0.

To avoid multiple terminals using the same frequency slot, in an embodiment an explicit assignment of slots to terminals, i.e. transmitters is used. Therefore, such an embodiment is advantageously used in systems employing a deterministic MAC scheme with a centralized scheduler here given by a central unit 4. Such systems may benefit from conventional technology related to estimating and correcting a frequency offset between a local clock of a receiving transceiver. While such conventional technology may allow significant reduction of the guard interval x, this second variant still allows optimizing system capacity for any system with any non-zero guard interval x.

The second variant provides a method for dimensioning the carrier signal bandwidth or sub-slot bandwidth $BW(M_S)$ as a function of the guard interval size x. The number of frequency sub-slots $M_S$ and, thus, the sub-slot bandwidth $BW(M_S)$ are chosen in order to maximize system capacity $Cap_S$.

This method may also be used to trade-off and optimize for competing requirements, e.g. hardware cost (e.g. driven by oscillator accuracy), implementation cost (e.g. employing means for frequency error estimation and correction) and cost per bit (e.g. system capacity vs. bandwidth cost).

A third variant or third type of embodiment takes a probabilistic approach, were the local oscillator accuracy is assumed being a random variable with a known or estimated probability distribution.

A typical example for such a probability distribution is the Normal Distribution $\mathcal{N}(\mu, \sigma^2)$, with $\mu$ being the mean (or nominal) centre frequency, $\sigma$ being the standard deviation and $\sigma^2$ being the variance. Assuming such a probability distribution, it is possible to calculate the likelihood of two or more terminals partially or fully overlapping in frequency.

In a first step, the likelihood $L(M_S, x)$ of two or more terminals using overlapping frequency ranges is calculated as a function of the number of carriers or frequency sub-slots $M_S$ and the nominal size of the guard interval x.

This allows determining the likelihood $L(M_S,U)$ of transmissions properly received—i.e. of signals not partially overlapping in frequency and not falling partially outside the designated system bandwidth—as a function of the number of sub-slots $M_S$ and of me utilization:

$$U = BW_s - 2M_S x/BW_s = 1 - 2x * \frac{M_S}{BW_s}.$$

The frequency utilization U describes the fraction of the system bandwidth $BW_s$ used by more than one transmitter for emitting signals. For example, value U=0 indicates that no frequency is used by more than one transmitter, whereas U=50% indicates that a half of the bandwidth is used by more than one transmitter, i.e. a half of the available frequencies is used for more than one signal leading to a potential collision of the associated signals on the side of the receiving unit.

In a second step, system capacity $Cap_S(M_S, U)$ is calculated as a function of the number of sub-slots $M_S$ and frequency utilization U. For this, the above mentioned carrier signal to noise and carrier signal to interference ratios are used in one embodiment. Hence, the system capacity is calculated based on the models and data describing the signal propagation within the system.

This calculation assumes in one embodiment a reduced signal carrier bandwidth $BW'(M_S)$ (or $BW_K$), with $BW'(M_S)=BW(M_S)*U$. This implies that the carrier signal to noise and interference ratio—as used by calculating the system—is thereby scaled up by 1/U.

To account for the degrading effect on system capacity due to transmissions lost due to partially overlapping in frequency or falling partially outside the designated spectrum, each $Cap_S(M_S, U)$ is weighted with the corresponding likelihood $L(M_S, U)$ calculated in the first step.

This second variant is demonstrated using $BW_s=1$ and $3\sigma=x=0.05$, with the (nominal) signal carrier center frequency equidistantly spaced using $\mu(M_S, i)=\mu_0+(2i-\frac{1}{2}M_S)\cdot BW_s$; $i=1:M_S$.

Figure 10:
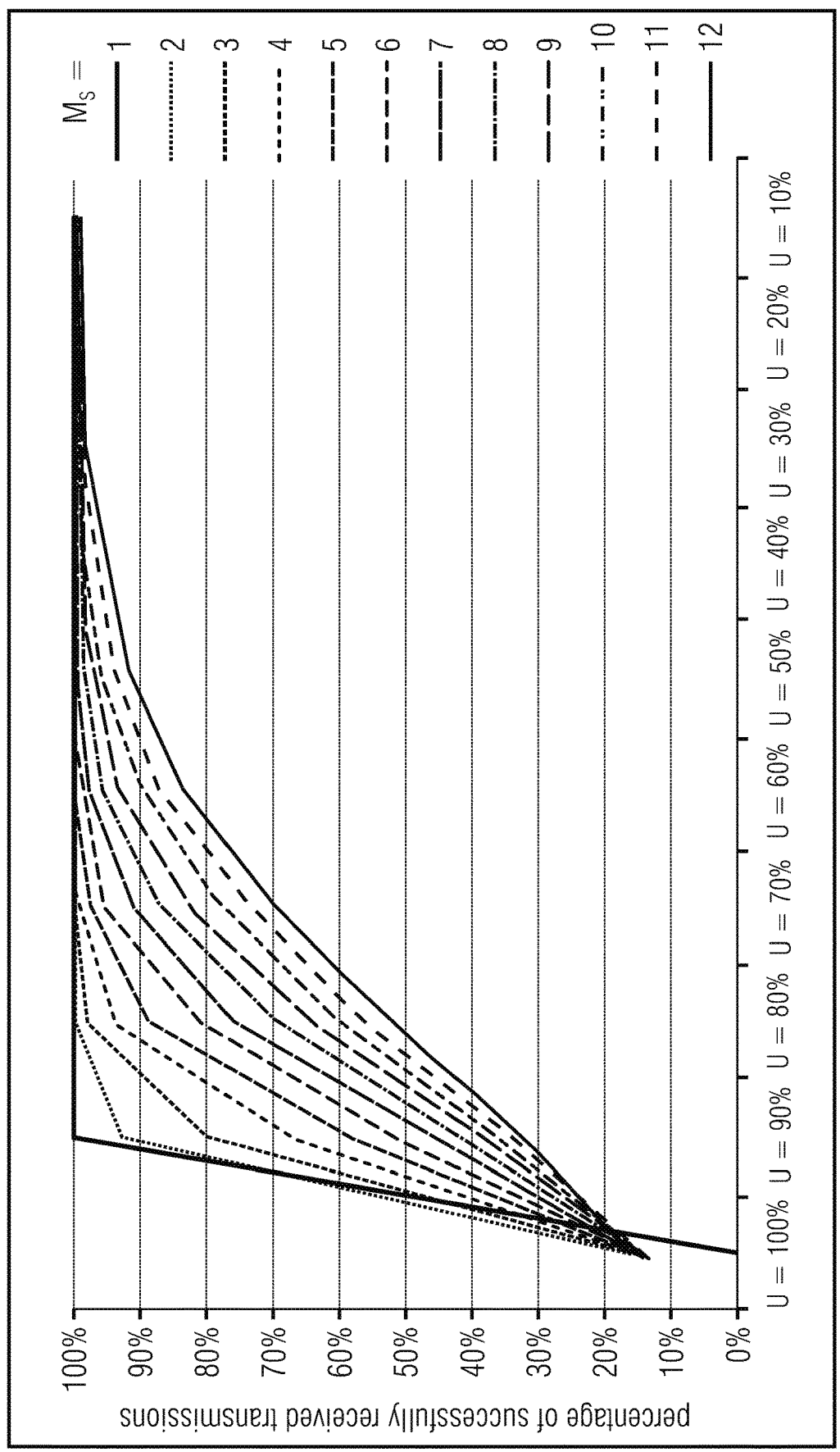
FIG. 10 shows the percentage of successfully received transmission depending on the utilization and for different numbers $M_S$ of sub-slots.

The likelihood $L(M_S, U)$ is illustrated in FIG. 10, providing the percentage of successfully received transmissions (y-axis) as function of the number of frequency sub-slots $M_S$ and the frequency utilization U (x-axis). The shown result was obtained by using a Monte-Carlo type simulation with 1000 experiments per data point; alternatively analytical methods may be applied.

It can be seen that with an increasing number $M_S$ of frequency slots ($M_S=1$ is the highest line, while $M_S=12$ is given by the lowest line), the degrading effect (transmissions lost due to partially overlapping frequencies of falling partially outside of the designated bandwidth) as a result of increasing utilization U, i.e. of an increasing overlapping of signals (with regard to the x-axis shown from right to left) sets in sooner.

For example: With $M_S=1$, the percentage of successfully received transmissions (y-axis) decreases with an utilization of about 95%. With a number of frequency slots $M_S=12$, with a utilization of about 95%, the percentage of successfully received transmissions has fallen to about 30% and a utilization of about U=50% leads to a loss of 10% of the transmitted signals. Here, $M_s=1$ is a special case: for example, one transmitter and no overlapping in frequency. Hence, for Ms=1, transmissions are only lost due to falling outside the designated spectrum.

For the example with $M_s=2$ (second line from above of the different $M_S$-lines), with increasing utilization U the percentage of successfully received transmissions keeps constant, until a sharp decline of about 8% happens within a range of an increasing utilization by about 10%.

Figure 11:
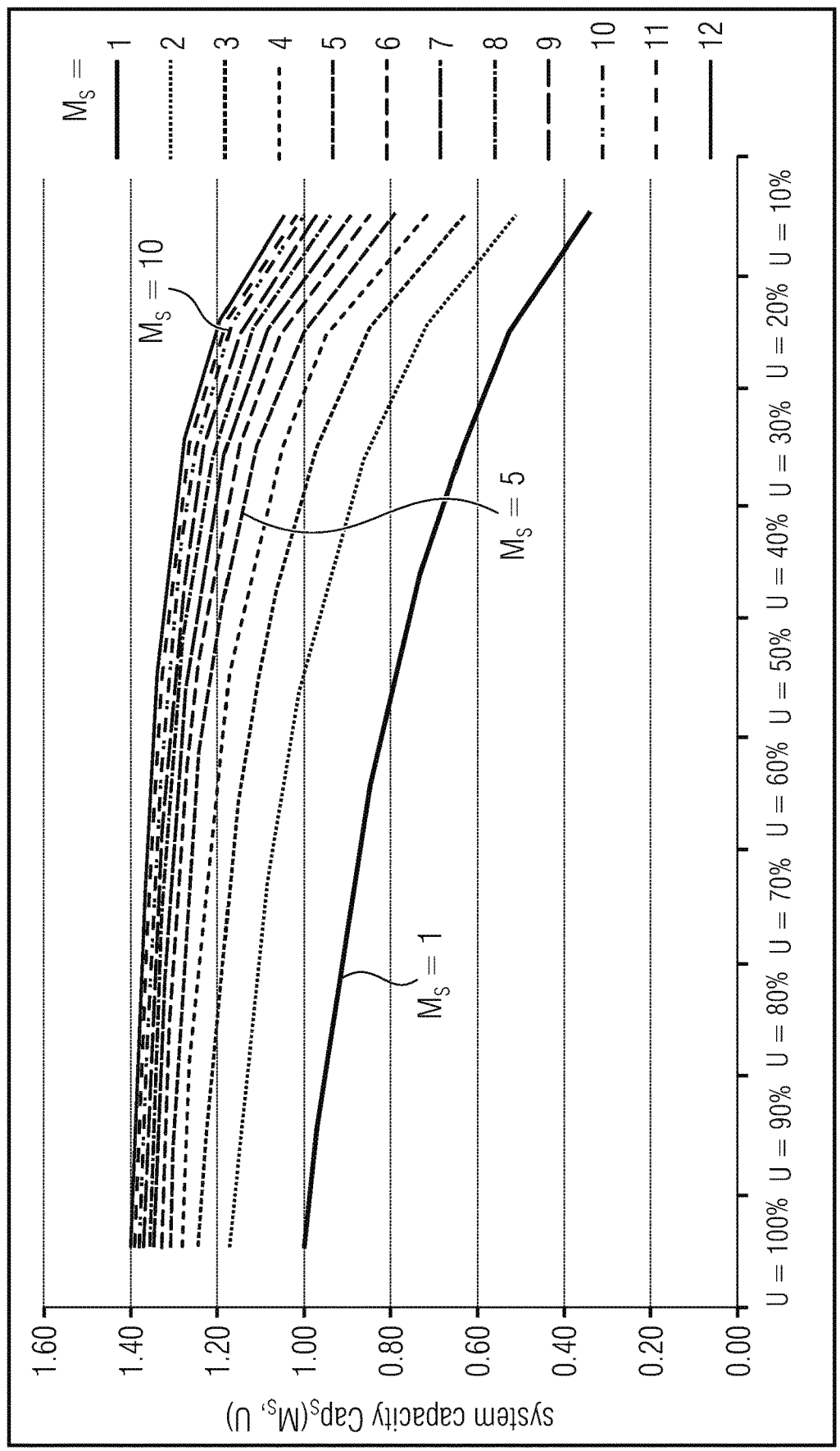
FIG. 11 shows the obtained system capacity of a system using the third variant.

FIG. 11 shows the result of the second step, the system capacity $Cap_S(M_S, U)$ as function of $M_S$ and U. As in FIG. 7, the result is normalized to $Cap_S(M_S, U)=1$ for $M_S=1$ and U=100%. The lowest line is given by $M_S=1$ and the highest by $M_S=12$. It can be seen that with an increasing number of sub-slots $M_S$ an increased system capacity is given.

Figure 12:
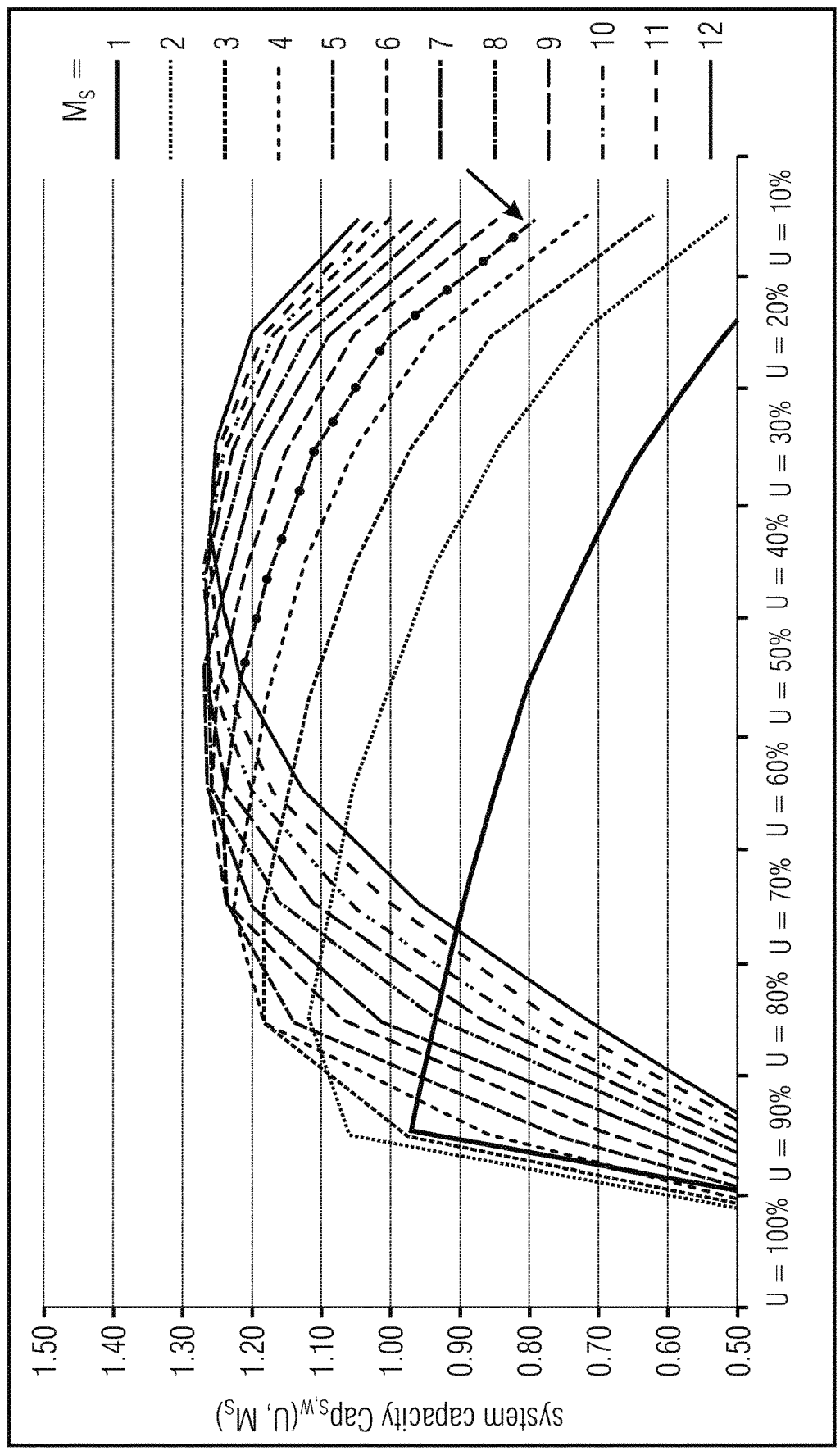
FIG. 12 shows the weighted system capacity as a combination of the data of FIG. 10 and FIG. 11.

FIG. 12 shows the weighted system capacity $Cap_{S,W}(U, M_S)$ as function of $M_S$ and U and being the combination of the data shown in FIG. 10 and FIG. 11.

There are several near-optimum parameter combinations. From these near-optimum combinations $M_S=8$ and BW=0.125 (marked with an arrow and dotted line) is the recommended number of frequency slots or carriers, providing a maximum $Cap_{S,W}(U, M_S)=1.27$. This corresponds to a recommended utilization U=50%, and an actual carrier signal bandwidth $BW'(M_S)=0.0625$.

Figure 13:
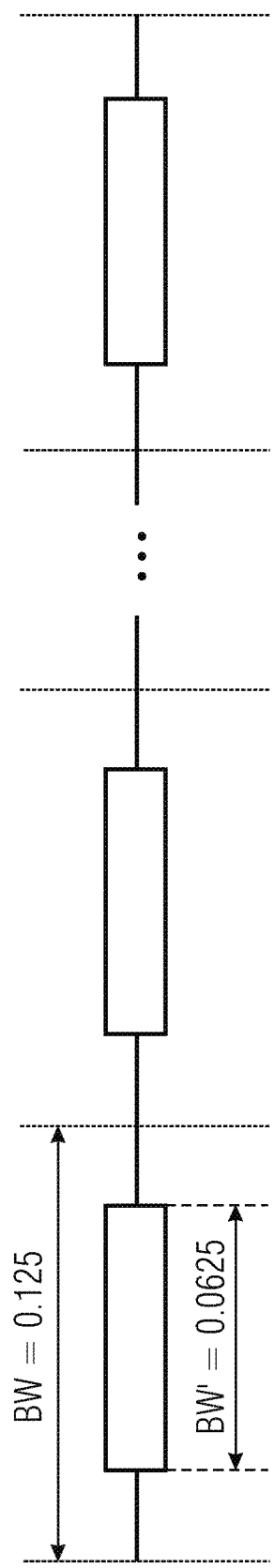
FIG. 13 illustrates nominal frequency slots for the third variant with $M_S=8$ and U=50% and FIG. 14 shows the position of sub-carriers within sub-slots of different frequency slots.

Nominal frequency slots and bandwidths are illustrated in FIG. 13. Here, an available bandwidth BW=0.125 is reduced to a used bandwidth BW'=0.0625. The reduced bandwidth is centered within the available bandwidth and takes the probability into account of overlapping frequencies used by different transmitters.

Figure 14:
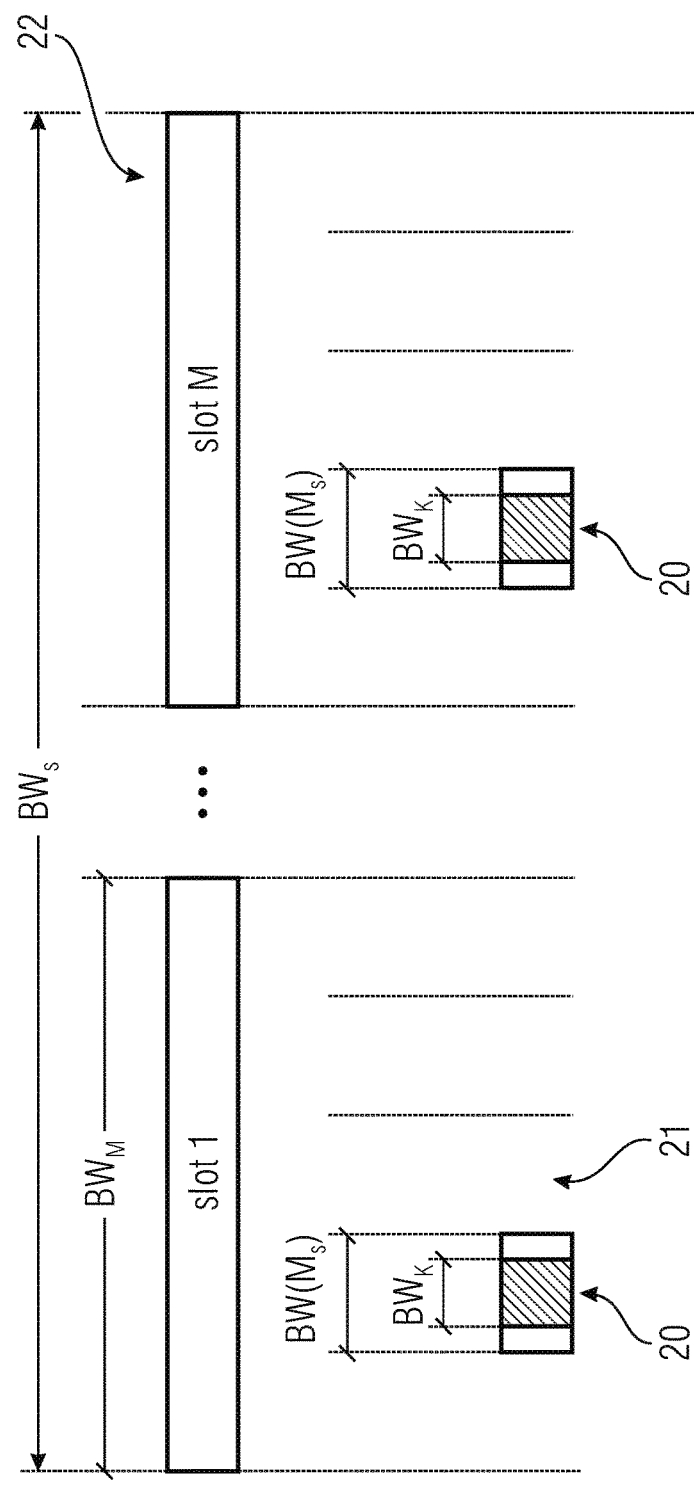

FIG. 14 shows the separation of the entire system bandwidth $BW_S$ into M frequency slots 22. Each frequency slot 22 has a bandwidth $BW_M$ and is divided into $M_S$ sub-slots 21. Each sub-slots 21 has a bandwidth $BW(M_S)$ which is given here by $BW(M_S)=BW_M/M_S$. Within the sub-slots 21 are the sub-carriers 20 present which are used to emit the part signals. The sub-carriers 20 have a bandwidth $BW_K$ which is smaller than the sub-slot bandwidth and is here given via the frequency utilization U as $BW_K=U*BW(M_S)$.

To avoid multiple terminals using the same frequency sub-slot, also the third variant advantageously uses in one embodiment an explicit assignment of sub-slots to terminals, e.g. by a central unit. Therefore, also this variant is advantageously used in systems employing a deterministic MAC scheme with a centralized scheduler.

The third variant provides a method for dimensioning the carrier signal bandwidth BW and a bandwidth utilization U as function of the oscillator accuracy distribution (associated with the guard level x) for a system advantageously using a (centralized) scheduler. Here, the values are also chosen for maximizing system capacity $Cap_S$.

This method may also be used to trade-off and optimize for competing requirements, e.g. hardware cost (e.g. driven by oscillator accuracy), implementation cost (e.g. employing means for frequency error estimation and correction) and cost per bit (e.g. system capacity vs. bandwidth cost).

This method is used in one embodiment to estimate and optimize the probability of a successful transmission (with and without re-transmission), as function of carrier signal bandwidth $BW_K$, bandwidth utilization U by using the likelihood values calculate in step 1.

The third variant is expanded in one embodiment by additionally considering the probability P that a slot is actually used, taking the current system loading as input; this leads to a modification of step 3, weighting $Cap_S(M_S, U)$ with the probability P and with the estimated likelihood $L(M_S, U)$ of a successfully transmission.

Based on current system loading, the (centralized) scheduler may select one of multiple configurations (calculated for different values of $M_S$ and U) to optimize the probability of a successful transmission (with and without re-transmission) for the current system loading and/or to increase carrier signal bandwidth BW (and thus decrease transmission time) when allowable, based on current system loading.

A fourth variant or fourth type of embodiment of the invention adopts the third variant to systems employing a distributed MAC scheme, where each terminal independently and randomly selects a frequency slot prior to transmission. Therefore, this variant is advantageously used in systems without a centralized scheduler and/or in systems that implement only an uni-directional link from the terminal to the satellite.

In this fourth variant, the first step of the third variant is modified and split into three sub-steps:

In the first sub-step, the likelihood that exactly $M_S$ terminals each use a transmission slot (or a sub-slot in an embodiment) is determined, using the assumed probability distribution of the terminal transmission activities. This step may be done analytically or using a Monte-Carlo type simulation.

In the second sub-step, $M_S$ transmitting terminals are assumed and $M_S$ (nominal) signal carrier center frequencies $\mu(i)$, i=1: $M_S$ are determined. This is done in a different embodiment, for example, by assuming a random frequency selection, a random slot selection or a pseudo-deterministic frequency hopping sequence (independent for each terminal i).

The third sub-step also assumes $M_S$ transmitting terminals and calculates the likelihood of two or more terminals using overlapping frequency ranges.

The second and third sub-step are repeated for each $M_S$ determined in the first sub-step and having a relevant likelihood.

The second step of the fourth variant is identical to the second step of the second variant, and consists of calculating system capacity $Cap_S(M_S, U)$ as a function of the number of sub-slots $M_S$ and frequency utilization U.

The third step of the fourth variant is a modified version of the third step of the third variant. Here, $Cap_S(M_S, U)$ is weighting by the estimated probability of having a successful transmission, as calculated in the third sub-step. Afterwards, $Cap_S(M_S, U)$ is further weighted by the likelihood that exactly $M_S$ sub-slots (or so called terminals) each uses a transmission slot as calculated in the first sub-step.

The fourth variant provides a method for dimensioning the carrier signal bandwidth BW and bandwidth utilization U as function of the oscillator accuracy distribution while maximizing system capacity $Cap_S$ for a system advantageously not using a (centralized) scheduler.

A system designed according to the fourth variant does not require a (centralized) scheduler. Medium access is independently managed by each terminal and requires no receive capability in the terminal.

This method may also be used to trade-off and optimize for competing requirements, e.g. hardware cost (e.g. driven by oscillator accuracy), implementation cost (e.g. employing means for frequency error estimation and correction) and cost per bit (e.g. system capacity vs. bandwidth cost).

This method may be used to estimate and optimize the probability of a successful transmission (with and without re-transmission), as function of carrier signal bandwidth BW, bandwidth utilization U by using the likelihood values calculate in step 1.

Based on current system loading (e.g. known to a terminal as a daily profile or communicated to the terminal using an auxiliary channel), each terminal may select one of multiple configurations (calculated for different values of $M_S$ and U) to optimize the probability of a successful transmission (with and without re-transmission) for the current system loading and/or to increase carrier signal bandwidth BW (and thus decrease transmission time) when allowable, based on assumed system loading.

The system refers to satellite or other communications:

Applications are, for example uni-directional (e.g. Machine to Machine (M2M) or "Internet of Things" (IoT) type) applications, with many terminals/transmitters transmitting or emitting data towards a satellite (or any other receiver, including terrestrial).

The inventions refers also to bi-directional (e.g. Machine to Machine (M2M) or "Internet of Things" (IoT) type) applications, with many terminals transmitting data towards a satellite and the same terminals also capable of receiving data from the satellite (or any other receiver, including terrestrial).

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Communication system,
comprising a plurality of transmitters (20) and a receiving unit,
wherein the transmitters are configured to divide signals to be emitted into K part signals and to emit the K part signals using K sub-carriers (20),
wherein K is an integer,
wherein the K sub-carriers are frequency bands exhibiting a sub-carrier bandwidth,
wherein the K sub-carriers are spaced in frequency, and
wherein the receiving unit is configured to receive signals emitted by the transmitters,
wherein a sub-carrier (20) of the K sub-carriers (20) having the lowest frequency is offset to a given frequency by a transmitter-individual offset ($O_i$), being based on a random variable leading to different locations of the respective K sub-carriers (20) amongst the transmitters (2),
or
wherein a sub-carrier (20) of the K sub-carriers (20) having the highest frequency is offset to a given frequency by a transmitter-individual offset ($O_i$), being based on a random variable, leading to different locations of the respective K sub-carriers (20) amongst the transmitters (2).

2. Communication system of claim 1,
wherein the K sub-carriers are equidistantly spaced in frequency with a sub-carrier distance.

3. Communication system of claim 1,
wherein each sub-carrier lies within a sub-slot, and
wherein each sub-slot is a frequency band exhibiting a sub-slot bandwidth.

4. Communication system of claim 3,
wherein the sub-slot bandwidth is equal to or greater than the sub-carrier bandwidth.

5. Communication system of claim 3,
wherein the sub-slot bandwidth of the sub-slots is equal to or greater than the sum of the sub-carrier bandwidth of the sub-carrier and two times a guard level, and
wherein the guard level is depending on a frequency error associated with the transmitters.

6. Communication system of claim 3,
wherein the sub-carrier bandwidth is equal to or smaller than the sub-slot bandwidth of the sub-slots times a frequency utilization based on a probability of transmitters emitting overlapping signals.

7. Communication system of claim 3,
wherein a number of sub-slots is chosen with regard to a system capacity describing a rate at which information can be reliably transmitted from the transmitters towards the receiving unit.

8. Communication system of claim 1,
wherein a system bandwidth is divided into a plurality of frequency slots exhibiting slot bandwidth, and
wherein each frequency slot is divided into a plurality of sub-slots.

9. Communication system of claim 8,
wherein a distance between the sub-slots is based on the slot bandwidth.

10. Communication system of claim 1,
wherein a central unit is configured to assign frequency slots and/or sub-slots to transmitters in order to be used for emitting the signals,
and/or
wherein at least one transmitter is configured to select at least one frequency slot and/or at least one sub-slot to be used for emitting the signals.

11. Communication system of claim 7,
wherein a number of sub-slots is a positive integer,
wherein the number of sub-slots is smaller than a maximal sub-slot number,
wherein the maximal slot number is depending on a slot bandwidth divided by a guard level, and
wherein the guard level is depending on a frequency error associated with the transmitters.

12. Communication system of claim 1,
wherein a number of sub-slots is chosen taking a probability for overlapping signals emitted by different transmitters into account, and
wherein the probability depends on a frequency utilization describing a number of transmitters emitting overlapping signals.

13. Communication system of claim 12,
wherein a frequency utilization is depending on a system bandwidth, the number of sub-slots and a guard level depending on a frequency error associated with the transmitters.

14. Communication system of claim 7,
wherein the number of frequency slots is set to 1,
or
wherein the number of frequency slots is set such that a slot bandwidth equals a given reference value,
or
wherein the number of frequency slots is set such that the slot bandwidth and a resulting sub-slot bandwidth facilitate calculations.

15. Transmitter,
wherein the transmitter (20) is configured to divide a signal to be emitted into K part signals and to emit the K part signals using K sub-carriers (20),
wherein K is an integer, and
wherein the K sub-carriers are frequency bands exhibiting a sub-carrier bandwidth and are spaced in frequency;
wherein a sub-carrier (20) of the K sub-carriers (20) having the lowest frequency is offset to a given frequency by a transmitter-individual offset ($O_i$), being based on a random variable leading to different locations of the respective K sub-carriers (20) amongst the transmitter (2) and further transmitters,
or
wherein a sub-carrier (20) of the K sub-carriers (20) having the highest frequency is offset to a given frequency by a transmitter-individual offset ($O_i$), being based on a random variable, leading to different locations of the respective K sub-carriers (20) amongst the transmitter (2) and further transmitters.

16. Transmitter of claim 15,
wherein one sub-carrier exhibits an offset to a given frequency, and
wherein the offset depends on a frequency error of the transmitter with regard to the emission of signals.

\* \* \* \* \*